March 16, 1954     F. LEE     2,672,318
JACK FOR AGRICULTURAL MACHINES
Filed Nov. 8, 1950
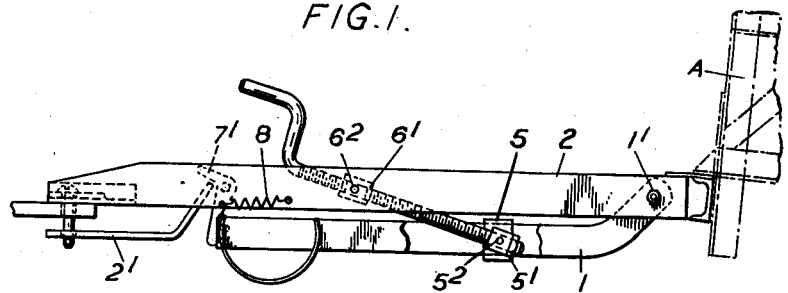
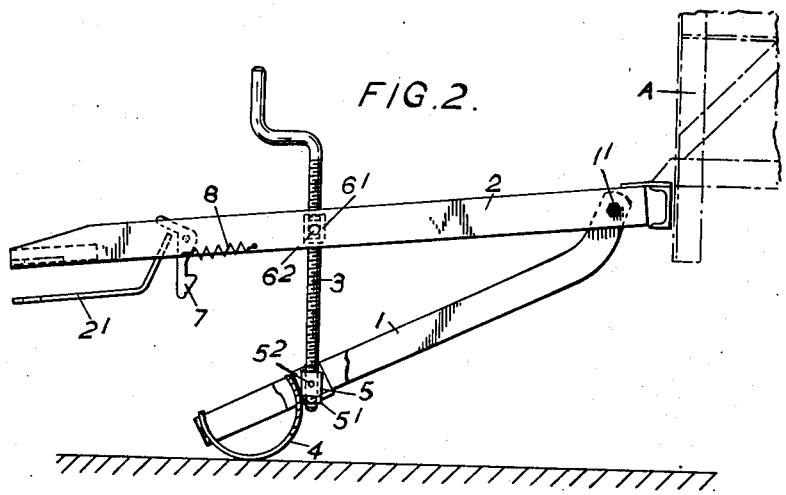
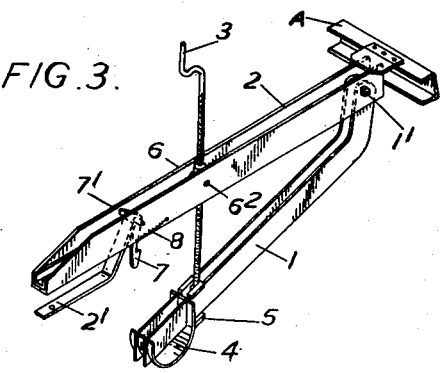
Inventor
Francis Lee Patented Mar. 16, 1954

2,672,318

UNITED STATES PATENT OFFICE 2,672,318

JACK FOR AGRICULTURAL MACHINES

Francis Lee, Stretford, England, assignor to Massey-Harris Limited, Stretford, England, a body corporate of Great Britain Application November 8, 1950, Serial No. 194,617

2 Claims. (Cl. 254—86)

This invention relates to improvements in jacks for agricultural vehicles and more particularly to trailers therefor.

According to the invention a channel shaped jack arm is pivoted to the tow bar and connected thereto intermediate its ends by a rod having a cranked end, a skid being mounted on the extreme end of the arm.

The invention will be described with reference to the accompanying drawings:

Fig. 1 is a side elevation of the jack arm in the raised position.

Fig. 2 is a similar view showing the jack arm lowered.

Fig. 3 is a perspective view of the draw bar and jack arm.

A tractor trailer A is drawn by a tow or draw bar 2 to which is pivoted a channel shaped arm 1, which is also connected thereto intermediate its ends by a screwed rod 3, having a cranked end. A U-shaped skid 4 is mounted on the extreme end of the arm 1.

The channel jack arm 1 is pivoted on a bolt 1¹ passing through the draw bar 2 of the trailer A. The free end of the arm 1 is connected to the draw bar 2 by the threaded spindle 3 universally attached at its lower end to a bracket 5 capable of sliding between the two sides of the arm. The bracket 5 is formed with two guide brackets engaging the sides of the channel arm 1 and with a nut 5¹ formed with pivots 5² engaging holes in the guide brackets to enable the nut to pivot in the bracket. The spindle 3 is screwed through a nut 6 mounted in a bracket 6¹ pivoted on the draw bar or pins 6². The cranked operating handle on its free end enables the rod 3 to be rotated to vary the inclination of the trailer A when jacked up in accordance with the height of the hitch on the tractor. The catch 7 is urged by spring 8 into engagement with the jack arm 1. When catch 7 is manually released, the jack arm drops downwardly, the bracket 6 sliding on the jack arm until it engages the skid 4 which serves as a stop.

In operation, before disconnecting the draw bar 2 from its tractor, the free end of the arm 1 is screwed down to a ground-engaging position to bring the skid 4 into contact with the ground, the bracket 5 having already travelled down the arm 1. After the tractor has been uncoupled, the forward end of the trailer A rests on the jack arm 1 with the draw bar 2 in the towing position ready for recoupling to the tractor A. After recoupling the trailer to the tractor the jack arm 1 may be raised slightly by rotating the screwed rod before the jack arm is manually pivoted to a position parallel to the draw bar 2 with the front of the skid 4 engaging the pivoted catch 7 on the draw bar (Fig. 2). The bracket 5 on the lower end of the screwed rod 3 slides up the arm during the raising operation.

The arm 1 is prevented from inadvertently being lowered during towing by the catch 7, the catch being prevented from moving too far when the arm 1 is released by a tail lever 7¹ thereon engaging the lower coupling member 2¹ of the draw bar 2.

I claim:

1. A vehicle jack arrangement for a trailer comprising in combination, a forwardly extending tow bar member attached at one end thereof to the trailer; a jack arm pivoted at one end thereof to said tow bar member movably from an inoperative position substantially parallel to the same to a ground-engaging position angularly spaced from said tow bar member; nut means pivotally mounted on said tow bar member spaced from said one end thereof; a bracket slidably mounted on said jack arm; stop means secured to the other end of said jack arm and limiting movement of said slidable bracket; a swivel pivotally mounted on said bracket; a threaded spindle screwed through said nut and fixedly secured at one end there of to said swivel, said spindle pivoting with said nut means from a raised inoperative position to a supporting position extending transversely to said tow bar member when said bracket slides along said jack arm while said jack arm pivots to said ground-engaging position; operating means on the other end of said threaded spindle for rotating the same for adjusting said ground-engaging position of said jack arm; releasable holding means for holding said jack arm in said inoperative position.

2. A vehicle jack arrangement for a trailer comprising in combination, a forwardly extending tow bar member attached at one end thereof to the trailer and including two parallel bars; a jack arm pivoted at one end thereof to said tow bar member movably from an inoperative position substantially parallel to the same and extending between said two bars to a ground-engaging position angularly spaced from said tow bar member; nut means pivotally mounted on said tow bar member spaced from said one end thereof and located between said two bars; a bracket slidably mounted on said jack arm movably from a position located adjacent to the pivoted end of said jack arm to a position located adjacent to the free end of said jack arm; a swivel pivotally mounted on said bracket; a threaded spindle screwed through said nut and fixedly secured at one end thereof to said swivel, said spindle pivoting with said nut means from a raised inoperative position to a supporting position extending transversely to said tow bar member when said bracket slides along said jack arm while said jack arm pivots to said ground-engaging position; a ground-engaging skid member secured to the free end of said jack arm and limiting movement of said slidable bracket; spring-loaded catch means pivotally mounted on said tow bar and releasably holding the free end of said jack arm in said inoperative position thereof; and handle means on the other end of said threaded spindle for rotating the same for adjusting said ground-engaging position of said jack arm.

FRANCIS LEE.

References Cited in the file of this patent

UNITED STATES PATENTS

| Number | Name | Date |
|---|---|---|
| 1,783,822 | Bolgard | Dec. 2, 1930 |
| 1,930,802 | Hamilton | Oct. 17, 1933 |
| 2,327,308 | Johnston | Aug. 17, 1943 |
| 2,499,882 | Seaholm | Mar. 7, 1950 |

FOREIGN PATENTS

| Number | Country | Date |
|---|---|---|
| 155,648 | Switzerland | Sept. 16, 1932 |